US011159823B2

(12) United States Patent
Han et al.

(10) Patent No.: US 11,159,823 B2
(45) Date of Patent: Oct. 26, 2021

(54) MULTI-VIEWPORT TRANSCODING FOR VOLUMETRIC VIDEO STREAMING

(71) Applicant: AT&T Intellectual Property I, L.P., Atlanta, GA (US)

(72) Inventors: Bo Han, Bridgewater, NJ (US); Jackson Jarrell Pair, Los Angeles, CA (US); Vijay Gopalakrishnan, Edison, NJ (US); Feng Qian, Minneapolis, MN (US)

(73) Assignees: AT&T INTELLECTUAL PROPERTY I, L.P., Atlanta, GA (US); THE TRUSTEES OF INDIANA UNIVERSITY, Bloomington, IN (US)

(*) Notice: Subject to any disclaimer, the term of this patent is extended or adjusted under 35 U.S.C. 154(b) by 22 days.

(21) Appl. No.: 16/447,144

(22) Filed: Jun. 20, 2019

(65) Prior Publication Data

US 2020/0404327 A1 Dec. 24, 2020

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/597* | (2014.01) |
| *G06T 7/73* | (2017.01) |
| *H04N 13/243* | (2018.01) |
| *H04N 13/282* | (2018.01) |

(52) U.S. Cl.
CPC .......... *H04N 19/597* (2014.11); *G06T 7/73* (2017.01); *H04N 13/243* (2018.05); *H04N 13/282* (2018.05); *G06T 2207/10028* (2013.01)

(58) Field of Classification Search
CPC .......................... H04N 13/282; H04N 19/597
See application file for complete search history.

(56) References Cited

U.S. PATENT DOCUMENTS

| | | | |
|---|---|---|---|
| 2017/0103535 A1* | 4/2017 | Mathsyendranath | ........................ A63F 13/537 |
| 2017/0287437 A1* | 10/2017 | Korzunov | ............... G06F 16/51 |
| 2018/0077409 A1* | 3/2018 | Heo | .................... G02B 27/0093 |

(Continued)

OTHER PUBLICATIONS

PARK ("Rate-utility optimized streaming of volumetric media for augmented reality." IEEE Journal on Emerging and Selected Topics in Circuits and Systems 9.1 (2019): 149-162.) (Year: 2019).*

(Continued)

*Primary Examiner* — Fabio S Lima

(57) ABSTRACT

In one example, a processing system including at least one processor may obtain at least one frame of a volumetric video, obtain a first viewport of a client device, render a plurality of two-dimensional subframes comprising two-dimensional projections of the at least one frame of the volumetric video, based upon the first viewport of the client device, and transmit the plurality of two-dimensional subframes to the client device. In another example, a processing system including at least one processor may request a volumetric video from a network-based proxy, provide a viewport to the network-based proxy, obtain a plurality of two-dimensional subframes from the network-based proxy in accordance with the viewport, select at least one of the plurality of two-dimensional subframes to present, and display the at least one two-dimensional subframe that is selected.

20 Claims, 5 Drawing Sheets

(56) References Cited

U.S. PATENT DOCUMENTS

| | | | | |
|---|---|---|---|---|
| 2018/0213225 | A1* | 7/2018 | Shen | H04N 19/597 |
| 2019/0158815 | A1* | 5/2019 | He | H04N 19/597 |
| 2019/0297332 | A1* | 9/2019 | Zheng | H04N 19/105 |
| 2020/0068235 | A1* | 2/2020 | Han | H04N 21/222 |
| 2020/0218346 | A1* | 7/2020 | Eash | G06F 3/013 |
| 2020/0228836 | A1* | 7/2020 | Schwarz | H04N 13/117 |
| 2020/0327703 | A1* | 10/2020 | Aflaki Beni | H04N 19/597 |

OTHER PUBLICATIONS

Hamza, Ahmed and Mohamed Hefeeda. "Adaptive streaming of interactive free viewpoint videos to heterogeneous clients." MMSys '16 (2016). 12 pages. https://api.semanticscholar.org/CorpusID:15656998.

Intel, "Encoding Video at the Edge with Intel® Xeon® Processors" Solution Brief. 2017. 4 pages.

Kobbelt, Leif & Botsch, Mario. (2004). A Survey of Point-Based Techniques in Computer Graphics. Computer. 28. 801-814. 10.1016/j.cag.2004.08.009. Dec. 2004Computers & Graphics 28(6):801-814; 23 pages. https://www.researchgate.net/publication/200018736_A_Survey_of_Point-Based_Techniques_in_Computer_Graphics.

Kowalski, Marek & Naruniec, Jacek & Daniluk, Michal. (2015). Livescan3D: A Fast and Inexpensive 3D Data Acquisition System for Multiple Kinect v2 Sensors. 318-325. 10.1109/3DV.2015.43. Conference: 2015 International Conference on 3D Vision (3DV), Oct. 2015; 9 pages, https://www.researchgate.net/publication/308807023_Livescan3D_A_Fast_and_Inexpensive_3D_Data_Acquisition_System_for_Multiple_Kinect_v2_Sensors.

Le, Tuan & Jeong, JongBeom & Ryu, Eun-Seok. (2019). Efficient Transcoding and Encryption for Live 360 CCTV System. Applied Sciences. 9. 760. 10.3390/app9040760. Feb. 2019, Applied Sciences 9(4):760; 18 pages. https://www.researchgate.net/publication/331278993_Efficient_Transcoding_and_Encryption_for_Live_360_CCTV_System.

Magio, Adrien & Lavoué, Guillaume & Dupont, Florent & Hudelot, Céline. (2015). 3D Mesh Compression: Survey, Comparisons, and Emerging Trends. Apr. 2015; 40 pages. https://www.researchgate.net/publicafion/280047242_3D_Mesh_Compression_Survey_Comparisons_and_Emerging_Trends.

Mangiante, Simone & Klas, Guenter & Navon, Amit & Zhuang, Guanhua & Ran, Ju & Silva, Marco. (2017). VR is on the Edge: How to Deliver 360° Videos in Mobile Networks. 30-35. 10.1145/3097895.3097901. Aug. 2017, Conference: the Workshop; 7 pages. https://www.researchgate.net/publicafion/319049968_VR_is_on_the_Edge_How_to_Deliver_360_Videos_in_Mobile_Networks.

Qian, Feng & Ji, Lusheng & Han, Bo & Gopalakrishnan, Vijay. (2016). Optimizing 360 video delivery over cellular networks. 1-6. 10.1145/2980055.2980056. Oct. 2016, Conference: the 5th Workshop; 6 pages. https://www.researchgate.net/publication/308571053_Optimizing_360_video_delivery_over_cellular_networks.

Qian, Feng & Han, Bo & Xiao, Qingyang & Gopalakrishnan, Vijay. (2018). Flare: Practical Viewport-Adaptive 360-Degree Video Streaming for Mobile Devices. 99-114. 10.1145/3241539.3241565. Oct. 2018, Conference: the 24th Annual International Conference; 16 pages. https://www.researchgate.net/publication/328322475_Flare_Practical_Viewport-Adaptive_360-Degree_Video_Streaming_for_Mobile_Devices.

Schnabel, Ruwen & Klein, Reinhard. (2006). Octree-based Point-Cloud Compression.. Eurographics Symposium on Point-Based Graphics. 111-120. 10.2312/SPBG/SPBG06/111-120. Jan. 2006, Conference: Symposium on Point Based Graphics, Boston, Massachusetts, USA, 2006. Proceedings; 11 pages. https://www.researchgate.net/publication/221571163_Octree-based_Point-Cloud_Compression.

* cited by examiner

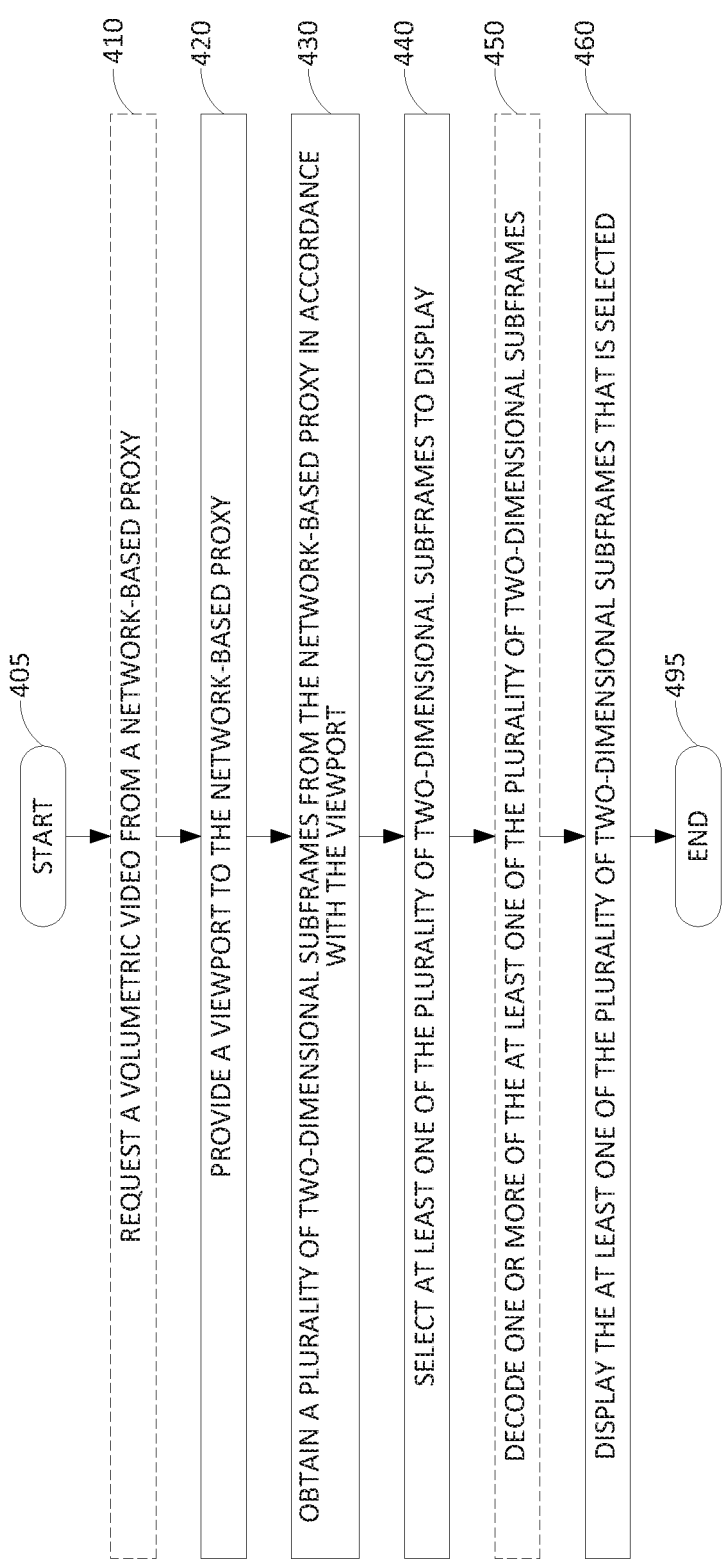

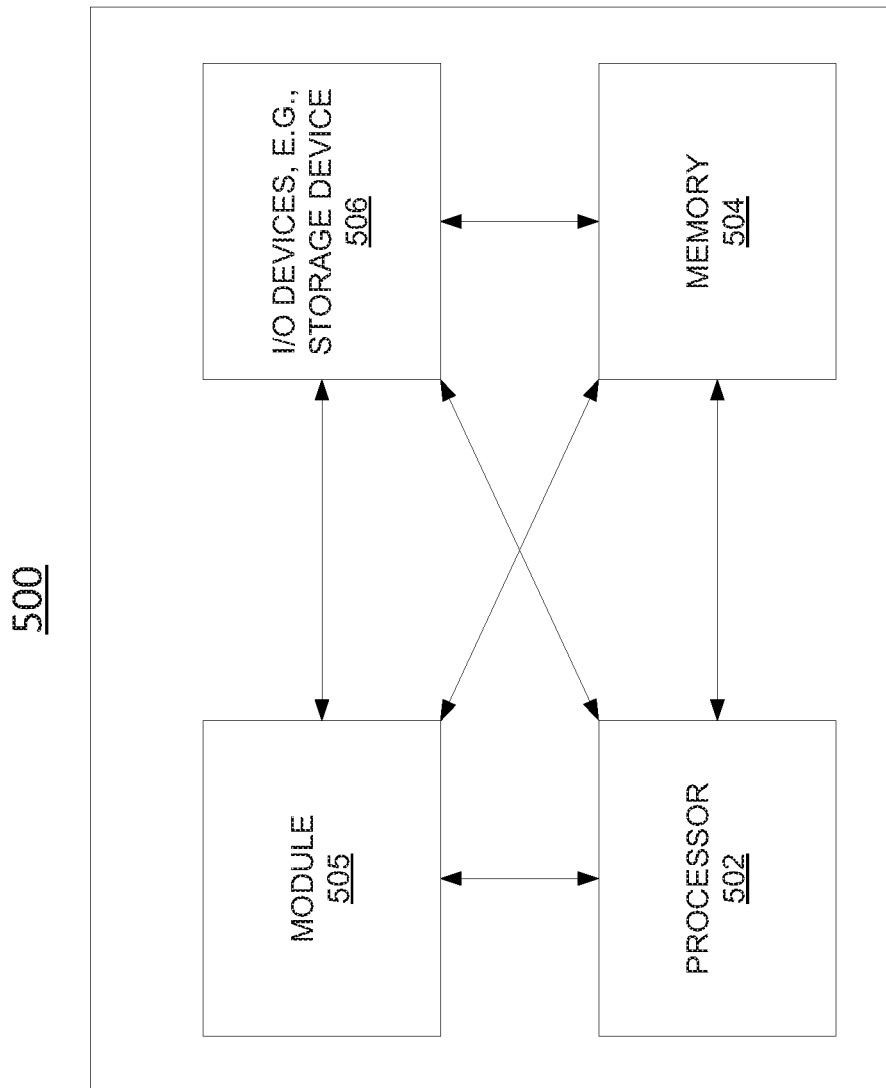

MULTI-VIEWPORT TRANSCODING FOR VOLUMETRIC VIDEO STREAMING

The present disclosure relates generally to volumetric video streaming, and more particularly to devices, non-transitory computer-readable media, and methods for providing two-dimensional subframes of a frame of a volumetric video, and to devices, non-transitory computer-readable media, and methods for selecting and presenting a two-dimensional subframe of a frame of a volumetric video.

BRIEF DESCRIPTION OF THE DRAWINGS

The teachings of the present disclosure can be readily understood by considering the following detailed description in conjunction with the accompanying drawings, in which:

FIG. 4 illustrates a flowchart of an example method for selecting and presenting a two-dimensional subframe of a frame of a volumetric video, in accordance with the present disclosure; and FIG. 5 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
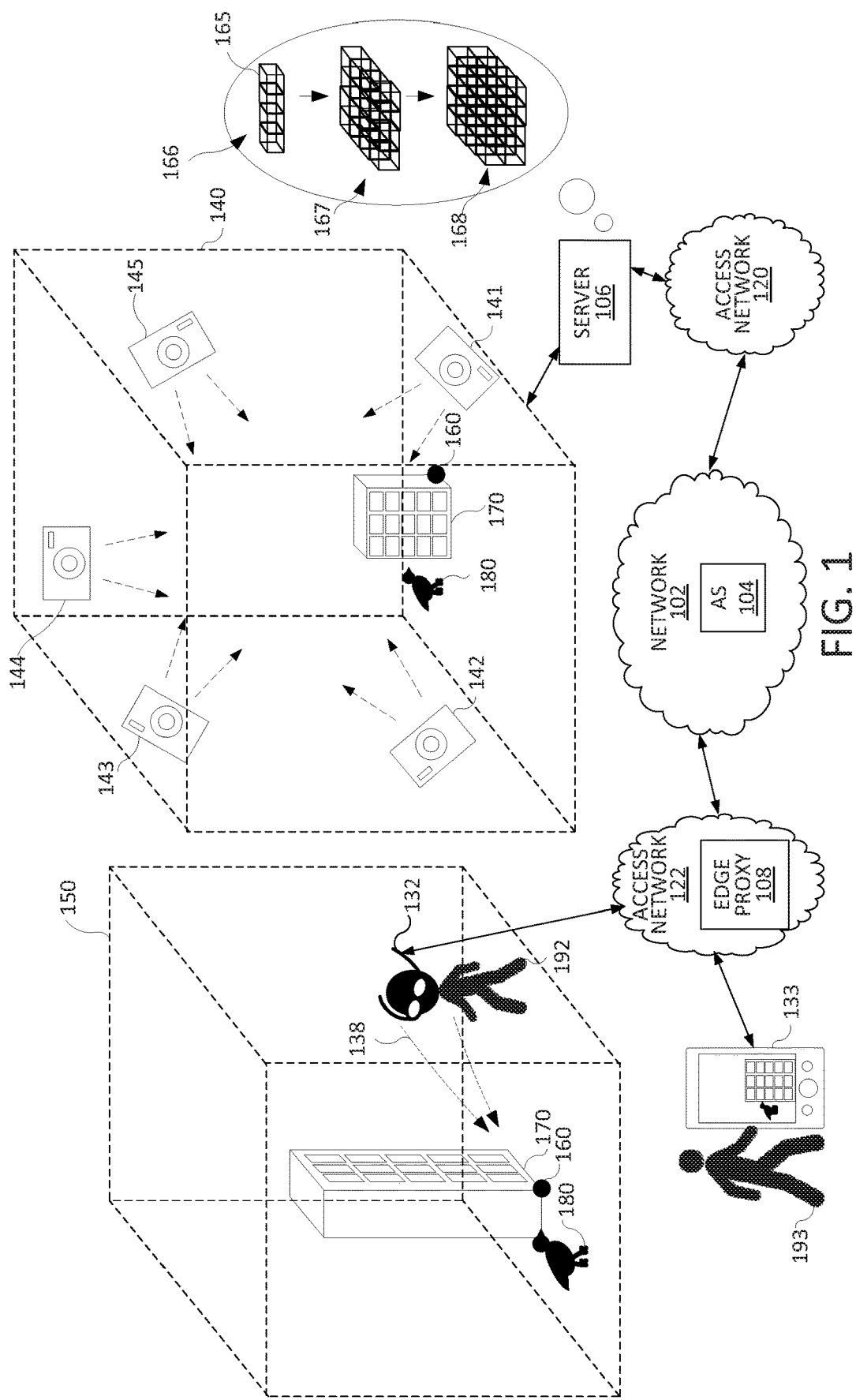
FIG. 1 illustrates an example network related to the present disclosure.

In one example, the present disclosure describes a device, computer-readable medium, and method for providing two-dimensional subframes of a frame of a volumetric video. For instance, a processing system including at least one processor may obtain at least one frame of a volumetric video, obtain a first viewport of a client device, render a plurality of two-dimensional subframes comprising two-dimensional projections of the at least one frame of the volumetric video, based upon the first viewport of the client device, and transmit the plurality of two-dimensional subframes to the client device.

In another example, the present disclosure describes a device, computer-readable medium, and method for selecting and presenting a two-dimensional subframe of a frame of a volumetric video. For instance, a processing system including at least one processor may request a volumetric video from a network-based proxy, provide a viewport to the network-based proxy, obtain a plurality of two-dimensional subframes from the network-based proxy in accordance with the viewport, select at least one of the plurality of two-dimensional subframes to present, and display the at least one two-dimensional subframe that is selected.

The present disclosure describes systems to deliver immersive viewing experiences of volumetric videos to all types of mobile devices, regardless of their computational power and hardware configuration. In one example, the decoding of compressed volumetric videos is offloaded from mobile devices to mobile edge proxies. Directly delivering uncompressed volumetric videos to mobile devices is bandwidth consuming. For instance, the bitrate of a point cloud-based volumetric video with around 50K points per frame on average may be as high as 100 Mbps. To illustrate, with around 50K points per frame on average, the bandwidth for streaming uncompressed frames at 24 FPS is 9×50K×24×8=86.4 Mbps (where each point occupies 9 bytes: position (X, Y, Z; 2 bytes each) and color (R, G, B; 1 byte each)). Despite the high bandwidth (up to 40 Mbps) offered by Long Term Evolution (LTE) cellular networks, the playback experience may include unacceptably long stalls. Although point cloud compression can reduce the network data usage of volumetric video streaming, the decoding performance on a high-end smartphone for dense point clouds may still be insufficient, e.g., ranging from 1.5 to 13.9 frames per second (FPS) for frames ranging in size from 100.7K to 12.6K (which is lower than the 24-30 FPS generally understood to correlate to a positive viewing experience).

In one example, a mobile device may send a current or recent viewport, or a predicted future viewport, to a network-based proxy (e.g., a server running on a mobile edge cloud). In one example, the network-based proxy may then transcode a volumetric video frame (e.g., a point cloud-based frame) into multiple pixel-based frames, referred to herein as "subframes" or "two-dimensional (2D) subframes," based upon the viewport(s) obtained from the mobile device, and provide the 2D subframes to the mobile device. In one example, the network-based proxy may be equipped with graphics processing units (GPUs). In particular, the parallelism provided by GPUs is well-suited to alleviate the high decoding demand of compressed/encoded volumetric video. In one example, the 2D subframes may include a subframe for a reported viewport, as well as for one or more nearby viewports generated based on predicting the (short-term) viewport movement. For instance, due to potential movement of the mobile device, the actual viewport may be different from that of a predicted viewport. If the prediction is accurate, one of these viewports will match the user's intended viewport. In addition even if the actual viewport is different from the predicted viewport, if some of the 2D subframes are for viewports that are at least close to the user's intended viewport, the mobile device may employ 2D scene reconstruction to achieve viewport approximation by "interpolating" the received subframes, and thus minimize the impact on quality of experience (QoE).

In one example, a network-based proxy may also include one or more machine learning algorithms (MLAs) or machine learning models (MLMs) to predict future viewports. As referred to herein, a machine learning model (MLM) (or machine learning-based model) may comprise a machine learning algorithm (MLA) that has been "trained" or configured in accordance with input data (e.g., training data) to perform a particular service, e.g., to predict viewports for viewing a volumetric video. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth. Notably, a MLA/MLM-based viewport prediction may achieve greater accuracy than other techniques, such as linear interpolation, entropy-based predictions, and so forth. However, such MLA/MLM-based predictions may be too computationally intense to run on a mobile device. Accordingly, examples of the present disclosure reduce the computation overhead of decoding, rendering, and displaying volumetric video on mobile devices.

In one example, the present disclosure may also cache popular volumetric video content on mobile edge clouds to further alleviate the congestion in the cellular core network. In addition, examples of the present disclosure may optimize cellular data usage and decrease energy consumption of mobile devices by network proxy-based transcoding as described herein.

Both regular and 360-degree videos are two-dimensional (2D) on either a plane or a sphere. In contrast, volumetric videos are three-dimensional (3D), comprising elements such as voxels (volume pixels) or 3D meshes (polygons). Different from 360-degree videos which are captured inside-out, volumetric videos are created outside-in which enables watching the same object from different directions. In one example, volumetric videos are captured using multiple RGB-D cameras with depth sensors, which acquire 3D data from different viewpoints. The acquired data may then be merged to obtain the entire scene. In addition, a volumetric video experience may provide six degrees of freedom (6DoF), allowing a viewer to freely change both the position (X, Y, Z) and the orientation (yaw, pitch, roll) of a viewport. Regular videos provide no viewport freedom, and 360-degree videos allow only three degrees of freedom (3DoF) since the viewer's translational position is fixed. Volumetric videos may be immersive, interactive, and expressive, and can support numerous use cases in diverse fields, such as entertainment, medicine, education, and so forth.

Volumetric videos can be represented in different ways. The present disclosure is described primarily in connection with examples utilizing a point cloud representation, where each video frame includes multiple voxels or points. A point cloud frame structure is a popular way to represent 3D objects due to a simple data structure (e.g., where each point occupies 9 bytes: position (X, Y, Z; 2 bytes each) and color (R, G, B; 1 byte each)) and acceptable rendering performance. However, it should be understood that the present disclosure is equally applicable to other representations such as 3D meshes. For instance, a 3D mesh-based volumetric video may employ a collection of meshes, which can be triangles, quadrangles, or general polygons, to represent the geometry of 3D models.

In any case, delivering volumetric video as a sequence of frames (e.g., comprising a stream of point clouds) to resource-constrained mobile devices and over bandwidth limited wireless links is challenging due to several reasons. First, a point cloud stream may utilize a large bandwidth, and wireless delivery may be impractical for many users without the support of future 5G networks. Second, unlike regular pixel-based videos that can be decoded using dedicated hardware, at present, decoding volumetric videos may be limited to software-based processes, which may incur a high computational overhead. Third, adaptive-bitrate (ABR) video streaming systems are widely available for 2D video and may utilize rate adaptation, quality of experience (QoE) inference, and buffer control. However, corresponding tools for volumetric video streaming may be either unavailable or nascent.

Examples of the present disclosure may relate to compressed volumetric videos as source content. For instance, volumetric videos associated with the present disclosure may compress 3D objects via an octree-based approach. To illustrate, an octree is a tree data structure that partitions a 3D region by recursively dividing the 3D region into eight subregions, with the level of detail being controlled by the height of the tree. When applied to a point cloud, an octree efficiently stores the points in such a way that the octree nodes correspond to regions of the space of the volumetric video that contain at least one point; the best estimation of the points' locations is given by the leaf nodes. In addition to compressing a single point cloud (or a single point cloud-based volumetric video frame), the octree can be extended to perform differential (delta) encoding between two point clouds (or interframe compression for a point cloud-based volumetric video).

A compressed/encoded volumetric video may reduce the network bandwidth for streaming the volumetric video to an endpoint device. However, directly decoding a compressed point cloud-based volumetric video on an endpoint device (such as a resource-constrained mobile device) may be computation intensive. For example, as described above, a mobile device (e.g., a high-end cellular smartphone) may achieve a FPS ranging from 1.5 to 13.9, which may be due to the costly operations of walking through the octree, inspecting each node, and reconstructing the decoded data to be consumed by the shader. Octree-based encoding may be lossy. Therefore, a point cloud processing library may support different resolution profiles that control the video quality by adjusting the height of the octree. For higher-resolution profiles, the FPS and compression ratio may further degrade. In addition, interframe encoding/compression of a point cloud-based volumetric video may further reduce the size of the volumetric video (and hence also the network bandwidth for streaming the volumetric video), but at the cost of even slower decoding speed on an endpoint device (e.g., a cellular smartphone).

In one example, the present disclosure introduces a network-based proxy (e.g., a server, or proxy server, that may be deployed at a network edge cloud) that transcodes the volumetric video stream (e.g., a point cloud stream) into a 2D (e.g., pixel-based) video stream that is delivered to the endpoint device and that captures the users' viewport. In accordance with the present disclosure, the 2D video stream can be efficiently decoded in accordance with the capabilities of current and widely-available mobile devices, such as H.264/H.265 decoders. Notably, it has been demonstrated that commodity edge servers are capable of decoding point cloud streams at line rate. For instance, for single-core decoding, a mid-range commodity server may outperform a current top-end smartphone by approximately 200 percent in terms of FPS. In addition, it has been determined that server performance scales well with the number of threads, and outperforms an example smartphone by up to 450 percent in a multi-core scenario. For instance, with 12.6K, 25.2K, 50.4K, 75.5K, and 100.7K points per frame, an example server may achieve decoding FPS rates of up to 190, 95, 47.0, 29.2, and 21.4, respectively.

In one example, network-based proxy transcoding may proceed as follows and may be subject to certain constraint based upon network and device capabilities: (1) fetching point cloud data (one or more volumetric video frames) from a content server (I/O bound), (2) decoding the point cloud stream (CPU bound), (3) rendering the point cloud stream based on the client's viewport position and orientation (GPU bound), (4) encoding the rendering result into a 2D/pixel video stream (DSP bound), and (5) sending the 2D video stream to the client (I/O bound). The client can efficiently decode the 2D stream through, for example, hardware H.264/H.265 decoders. It should be noted that the above tasks consume different types of system resources and thus can be executed in a pipelined manner.

In one example, a single "snapshot" for the current viewport position and orientation may be reported by the client. Let $t_1$ be the time when the client reports its viewport v, and $t_2$ be the time when the frame transcoded for v is displayed. Under the above transcoding approach, the delay $t_2-t_1$ is the so-called "motion-to-photon" latency (i.e., the time taken for a viewport movement to be reflected on the screen). In the five tasks described above, tasks (1) and (2) do not depend on the client's real-time viewport information so the decoded point cloud can be buffered beforehand. Tasks (3), (4), and (5) contribute to the motion-to-photon latency. In one example, rendering a point cloud frame with 50K points via a commodity server takes less than 1 ms, and the per-frame encoding time for 4K, 2K, and 1080p H.264 video is 10 ms, 5 ms, and 3 ms, respectively. In contrast, the per-frame decoding time on a high-end smartphone may be 11 ms, 5 ms, and 3 ms for 4K, 2K, and 1080p frames, respectively. Thus, the motion-to-photon delay for 4K, 2K, and 1080p resolutions are 21 ms, 10 ms, and 6 ms, respectively, plus corresponding network transmission times (including the uplink latency for reporting the viewport).

As mentioned above, in one example, the network-based proxy may transcode one point cloud frame into multiple pixel-based frames (2D subframes). Note $t_1$ and $t_2$ are defined previously. Due to the potential movement, the actual viewport for $t_2$ may be different from that for $t_1$. In the present example, the 2D subframes may include the reported viewport (at $t_1$) as well as nearby viewports generated for $t_2$ based on predicting the (e.g., short-term) viewport movement. If the prediction is accurate, then at $t_2$, one of these viewports will match the user's intended viewport. Having the 2D subframe available and displaying the 2D subframe for the viewport effectively eliminates the motion-to-photon delay. These and other aspects of the present disclosure are described in greater detail below in connection with the examples of FIGS. 1-5.

To further aid in understanding the present disclosure, FIG. 1 illustrates an example system 100 in which examples of the present disclosure for providing two-dimensional subframes of a frame of a volumetric video may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In accordance with the present disclosure, application server (AS) 104 may comprise a computing system or server, such as computing system 500 depicted in FIG. 5, and may be configured to provide one or more operations or functions in connection with examples of the present disclosure for providing two-dimensional subframes of a frame of a volumetric video. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for providing two-dimensional subframes of a frame of a volumetric video, in accordance with the present disclosure. In one example, AS 104 may comprise a physical storage device (e.g., a database server), to store various types of information in support of systems for providing two-dimensional subframes of a frame of a volumetric video, in accordance with the present disclosure. For example, AS 104 may store a library of volumetric videos or portions thereof (e.g., a plurality of frames). For ease of illustration, various additional elements of network 102 are omitted from FIG. 1.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a plurality of video capture devices, e.g., cameras 141-145. Similarly, access network 122 may be in communication with one or more devices, e.g., devices 132 and 133. Access networks 120 and 122 may transmit and receive communications between cameras 141-145, devices 132 and 133, and application server (AS) 104, other components of network 102, devices reachable via the Internet in general, and so forth. In one example, devices 132 and 133 may each comprise a mobile device, a cellular smart phone, a wearable computing device (e.g., smart glasses, a virtual reality (VR) headset, or the like), a laptop computer, a tablet computer, a desktop computer, or other types of personal computer, an application server, a bank or cluster of such devices, and the like. In one example, devices 132 and 133 may each comprise programs, logic or instructions for performing functions in connection with examples of the present disclosure for providing two-dimensional subframes of a frame of a volumetric video. For example, devices 132 and 133 may each comprise a computing system or device, such as computing system 500 depicted in FIG. 5, and may be configured to provide one or more operations or functions for selecting and presenting a two-dimensional subframe of a frame of a volumetric video, as described herein. An example method 400 for selecting and presenting a two-dimensional subframe of a frame of a volumetric video is described in greater detail below in connection with FIG. 4.

In the present example, a volumetric video may be captured from a scene at a physical location (e.g., in a physical environment 140). For instance, the cameras 141-145 may be deployed with different perspectives (e.g., different orientations and viewpoints) of the physical environment 140. In the present example, the cameras 141-145 may capture 2D videos of a building 170 and a bird 180. In one example, the volumetric video may be composited from the 2D videos obtained from the different cameras 141-145. For instance, the cameras 141-145 may feed the respective 2D videos to server 106, which may then compose the volumetric video using photogrammetric techniques. For instance, the visual scene at the physical environment 140 may be represented in the volumetric video as voxels 165 having positional coordinates (e.g., X, Y, Z with respect to a reference point), color information (e.g., red, green, blue values and/or cyan, magenta, yellow values), transparency information (e.g., zero to 100 percent), shading information, texture information, and so forth. For instance, voxels 165 are illustrated as being assembled into a row 166, into a layer 167, and into a block, or point cloud 168 which may represent all or a portion of the physical environment 140. In one example, the set of information values for respective voxels may change from one frame of the volumetric video to the next as objects move through the physical environment 140, as lighting or other environmental conditions change, and so forth. Thus, server 106 may calculate information values for each voxel and for each frame from the 2D videos sourced from the cameras 141-145.

For illustrative purposes, the physical environment 140 may include a reference point 160 which may be associated with the building 170. For instance, the building 170 may comprise a known landmark, and reference point 160 may denote a corner of the building 170. Alternatively, or in addition, wireless beacons (not shown) in physical environment 140 having known locations may be used as reference points, such as Institute of Electrical and Electronics Engineers (IEEE) 802.15 based-beacons, IEEE 802.11 wireless routers and/or access points (AP), cellular base stations (or more particularly, the base station antennas), etc. For instance, cameras 141-145 may determine their respective positions via observed time difference of arrival (OTDA), barycentric triangulation, or a similar technique with reference to one or more wireless beacons. In one example, cameras 141-145 may provide to the server 106 information from which the cameras' perspective(s) may be quantified, such as: position information (e.g., GPS coordinates, coordinates and/or a position vector in relation to reference point 160, etc.), orientation information (e.g., azimuth and/or elevation information derived from a gyroscope and compass), and so forth. As such, server 106 may generate the volumetric video as photogrammetric combinations of the 2D videos in accordance with the perspective information from cameras 141-145. It should be noted that the foregoing describes an example where the 2D video feeds of cameras 141-145 are temporally aligned. However, in other, further, and different examples, a volumetric video may be composited from 2D source videos capturing the same physical environment 140, but at different times. For instance, the building 170 may be substantially unchanged over a time period from which different 2D source videos may be obtained. A volumetric video may also be composited from 3D source videos capturing part of the same physical environment 140 from different directions.

In one example, the volumetric video may be stored at server 106 and may be made available to other requesting devices, or may be provided by server 106 to AS 104 for storage and for providing to other requesting devices (e.g., edge proxy 108 and/or devices 132 and 133). To illustrate, a user 192 may submit via device 132 a request to experience the volumetric video (e.g., submitting the request to the edge proxy 108, to AS 104, and/or to server 106). One or more of the edge proxy 108, AS 104, and/or server 106 may then be engaged to deliver 2D subframes of the volumetric video to the device 132. For instance, any of edge proxy 108, AS 104, and/or server 106 may comprise a computing system or server, such as computing system 500 depicted in FIG. 5, and may be configured to provide one or more operations or functions in connection with examples of the present disclosure for providing two-dimensional subframes of a frame of a volumetric video. An example method 300 for providing two-dimensional subframes of a frame of a volumetric video is described in greater detail below in connection with FIG. 3.

For example, the edge proxy 108 may obtain at least one frame of the volumetric video, e.g., from server 106 and/or from AS 104. Alternatively, or in addition, the edge proxy 108 may already have the at least one frame cached/stored therein. For instance, the edge proxy 108 may have recently streamed 2D subframes of the volumetric video to a different device, and the at least one frame of the volumetric video may remain stored therein. Edge proxy 108 may also obtain a first viewport of device 132. For example, device 132 may transmit information regarding a current viewport (e.g., a location of device 132 within the space 150 and the perspective 138), a recent viewport, and/or a predicted viewport of the device 132. In one example, edge proxy 108 may calculate a predicted viewport based upon current and/or recent viewport information provided by the device 132.

In any case, the edge proxy 108 may then render a plurality of 2D subframes comprising 2D projections of the at least one frame of the volumetric video, based upon the first viewport of the device 132. As described above, the 2D subframes may include a 2D subframe corresponding to the first viewport, as well as one or more additional subframes from nearby viewports (e.g., having a change in location and/or perspective from the first viewport). In addition, edge proxy 108 may transmit the plurality of 2D subframes to the device 132 for display to the user 192. It should be noted that various additional operations may be performed by edge proxy 108, such as applying a machine learning model (MLM) to obtain the predicted viewport based upon various inputs, selecting nearby viewports, obtaining information regarding popular viewports of other viewers of the same volumetric video, decoding the volumetric video stream (e.g., where the volumetric video is obtained from AS 104 and/or server 106 in a compressed/encoded format), encoding the plurality of 2D subframes, e.g., interframe encoding of temporally sequential 2D subframes, interframe encoding of spatially overlapping or spatially adjacent 2D subframes, intraframe encoding, and so forth. In addition, device 132 and/or user 192 via device 132 may provide commands to start, stop, pause, resume, etc. to change the viewport, and so on. For instance, a user interface of device 132 may provide for the user 192 to move a viewport left/right, up/down, forward/backward, etc., to select coordinates or define a position with respect to a reference point (e.g., reference point 160), and so forth. In one example, the user 192 may change viewports by changing a location, e.g., by walking, changing a focus, e.g., by moving the user's head and/or eyes, changing a zoom level via a specific command and/or via eye adjustment, and so on.

In one example, device 132 may obtain the 2D subframes and may decode the 2D subframes for rendering via the display components of the device 132. Alternatively, or in addition, device 132 may be paired with another local computing device (not shown), such as a personal computer or a mobile device (e.g., a smartphone) of user 192, for performing operations or functions for decoding the 2D subframes (e.g., a stream comprising a plurality of the 2D subframes), selecting which 2D subframes to display in accordance with an actual viewport of the device 132, providing the decoded 2D subframes to device 132 for display, and so forth.

As further illustrated in FIG. 1, another user 193 may also experience the volumetric video via the device 133. For instance, device 133 may comprise a mobile computing device, such as a smartphone, a tablet, or the like with a 2D display screen. In one example, edge proxy 108 may provide a 2D output video comprising a 2D projection of the volumetric video from one or more viewports to device 133. Specifically, each frame of the volumetric video may be transcoded into a plurality of different 2D subframes. Device 133 may provide a first viewport (e.g., a current viewport, one or more recent viewports, and/or one or more predicted viewports of the device 133) to the edge proxy 108. Alternatively, or in addition, edge proxy 108 may calculate the first viewport (e.g., a predicted viewport) based upon current and/or recent viewport information provided by the device 133. In any case, the edge proxy 108 may then render a plurality of 2D subframes comprising 2D projections of the at least one frame of the volumetric video, based upon the first viewport of the device 133. As described above, the 2D subframes may include a 2D subframe corresponding to the first viewport, as well as one or more additional subframes from nearby viewports (e.g., having a change in location and/or perspective from the first viewport). In addition, edge proxy 108 may transmit the plurality of 2D subframes to the device 133 for display to the user 193. It should be noted that various additional operations as described above may also be performed by edge proxy 108.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. For instance, edge proxy 108 may comprise a CDN edge server, server 106 may comprise an ingest server, and so on. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within physical environment 140.

In one example, application server 104 may comprise network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access networks 120 and 122 comprise radio access networks, the nodes and other components of the respective access networks 120 and 122 may be referred to as mobile edge infrastructure. As just one example, edge proxy 108 may be instantiated on one or more servers hosting virtualization platforms for managing one or more virtual machines (VMs), containers, microservices, or the like. In other words, in one example, edge proxy 108 may comprise a VM, a container, a microservice, or the like. Thus, these and other modifications are all contemplated within the scope of the present disclosure.

Figure 2:
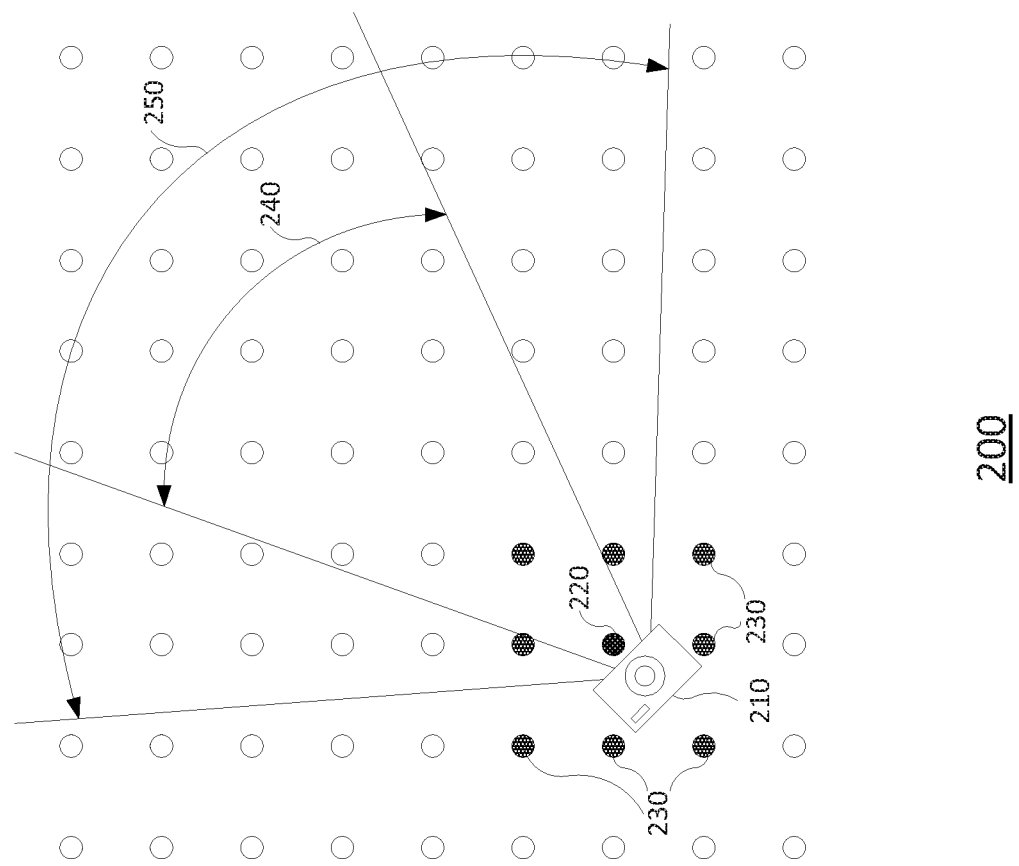
FIG. 2 illustrates an example of a plurality of potential camera positions for a volumetric video, in accordance with the present disclosure.

FIG. 2 illustrates an example of a plurality of potential camera positions 200. In one example, the plurality of potential camera positions 200 may correspond to voxels in three dimensions. However, for ease of illustration, a 2D slice is depicted in FIG. 2. In the example of FIG. 2, the camera 210 represents a viewport location 220 (which may correspond to a voxel or point in space). The orientation of the viewport is in the direction illustrated by the field of view (FOV) 240. When actually generating subframes, the network-based proxy may take two approaches. First, the network-based proxy may generate subframes for viewports at nearby candidate locations 230 to accommodate to the potential translational movement of the viewport. Second, the network-based proxy may enlarge some subframes' viewports to include data for greater than the FOV (such as range 250) to tolerate possible rotational movement. In one example, a larger-than-FoV subframe may be generated using a panoramic representation such as an equirectangular representation or CubeMap representation, such that any FoV covered by the subframe can be restored.

In one example, the network-based proxy may utilize one or more machine learning models (MLMs) to predict the viewport movement. In 3DoF panoramic video streaming, it has been demonstrated that yaw, pitch, and roll can be accurately predicted in the near future (less than 0.5 seconds or so), and such MLMs may be similarly applied in the context of volumetric video viewport prediction. Leveraging several short-term prediction algorithms, the network-based proxy may dynamically determine how many and which viewports (subframes) to include, as well as each viewport's position and orientation (and in some cases FOV size). Several factors may be used as inputs to the MLM(s), such as: the speed, direction, and mode (orbit, zoom, pan) of the viewport movement, information regarding viewport popularity with other viewers (e.g., "heatmaps"), information regarding the viewer interests, and so forth.

In one example, the network-based proxy may encode multiple subframes into a "mega frame" and sends it to the client. Due to their proximity, the subframes in a mega frame are visually similar, allowing efficient cross-subframe (interframe) compression. During a playback, the client may pick one subframe from each mega frame to decode and display. To reduce the decoding overhead, the network-based proxy may leverage codec features such as the Tiling Mode in H.265 to let the client decode only the selected subframe in each mega frame. Regarding the actual selection policy, the selected subframe's viewport should be the closest to the user's intended viewport. Nevertheless, in situations where the actual viewport does not directly correspond to one of the subframes delivered to the client, fast 2D scene reconstruction techniques may be used to achieve viewport approximation by "interpolating" the received subframes.

Figure 3:
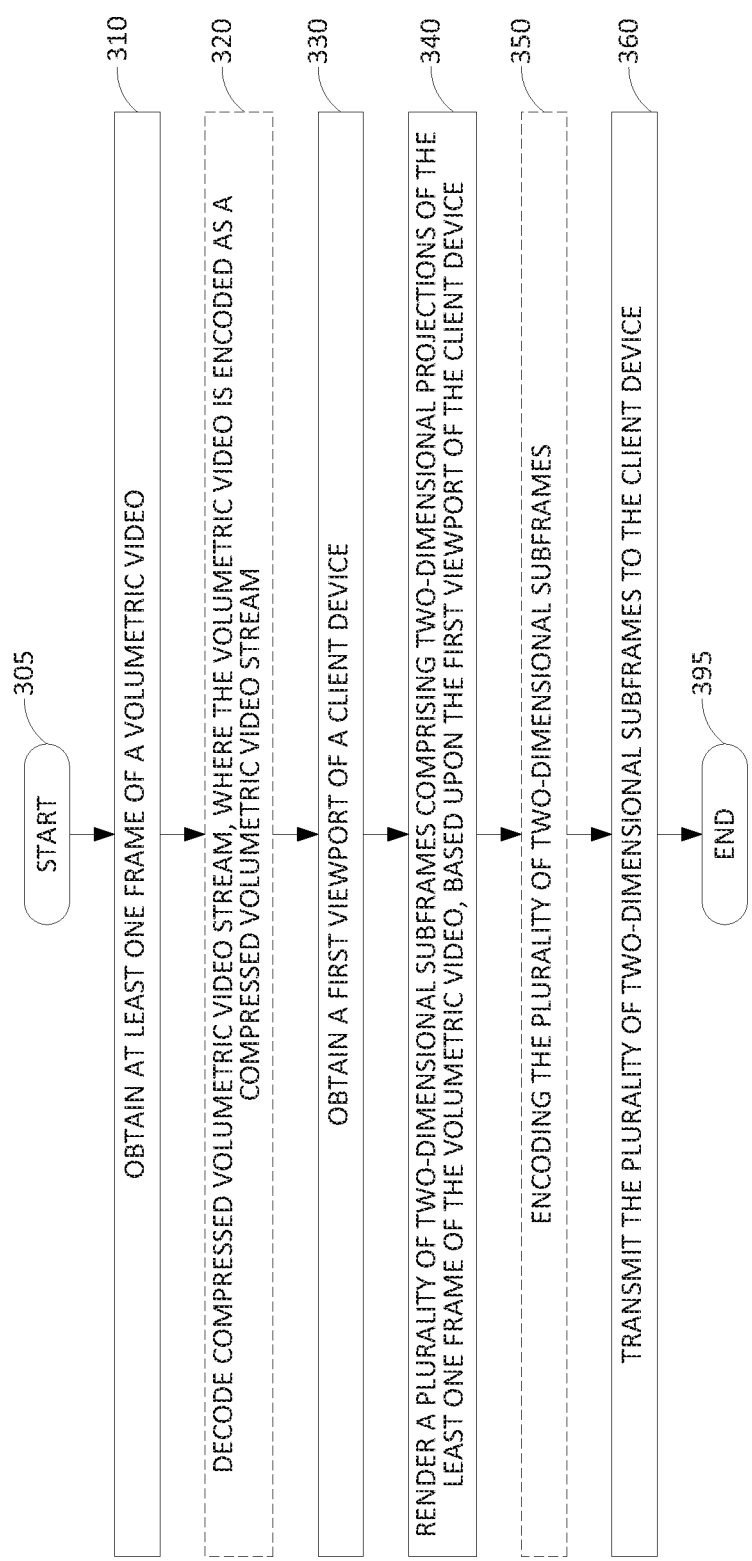
FIG. 3 illustrates a flowchart of an example method for providing two-dimensional subframes of a frame of a volumetric video, in accordance with the present disclosure.

FIG. 3 illustrates a flowchart of a method 300 for providing two-dimensional subframes of a frame of a volumetric video, in accordance with the present disclosure. In one example, the method 300 is performed by a component of the system 100 of FIG. 1, such as by one of: edge proxy 108, AS 104, server 106, and so forth, and/or any one or more components thereof (e.g., a processor, or processors, performing operations stored in and loaded from a memory), or by a plurality of such devices in conjunction with one another, and so on. In one example, the steps, functions, or operations of method 300 may be performed by a computing device or system 500, and/or processor 502 as described in connection with FIG. 5 below. For instance, the computing device or system 500 may represent any one or more components of one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system. The method 300 begins in step 305 and proceeds to step 310.

At step 310, the processing system obtains at least one frame of a volumetric video. For instance, the processing system may store a copy of the volumetric video and/or one or more frames thereof. Alternatively, the processing system may obtain the at least one frame of the volumetric video from a content server, e.g., a storage server, a CDN ingest or edge server, and so forth. In one example, the at least one frame may be received as a volumetric video stream (e.g., a sequence of frames). In one example, the at least one frame is obtained in response to a request from a client (e.g., an endpoint device) for the volumetric video and/or at least a portion of the volumetric video. In one example, the at least one frame is obtained as part of at least a portion of the volumetric video comprising an encoded plurality of frames.

At optional step 320, the processing system may decode the volumetric video stream, e.g., in an example where the at least one frame is obtained as part of a volumetric video stream that is encoded/compressed. For instance, the volumetric video may be encoded/compressed and may be delivered to the processing system and/or stored by the processing system as a compressed volumetric video stream. Accordingly, optional step 320 may include decoding the compressed volumetric video stream to recover the at least one frame (e.g., an uncompressed version thereof). For instance, the encoding/compression may comprise octree-based compression, may include interframe encoding (e.g., delta encoding) and so forth, and the processing system may reconstruct the original frames (or as accurate a representation as can be achieved) via the decoding.

At step 330, the processing system obtains a first viewport of a client device. In one example, the first viewport is a current viewport of the client device, or a recent viewport of the client device. In another example, the first viewport comprises a predicted viewport that may be provided by the client device for an anticipated future time. In one example, the viewport comprises a position and an orientation. The orientation may comprise, for example, a yaw and a pitch (or azimuth and elevation). The orientation may also comprise a roll (e.g., such as if a user tilts the display of the client device). In one example, the viewport further comprises a field-of-view (FOV), e.g., 60-90 degrees in two dimensions normal/perpendicular to the orientation, a rectangular or oval region corresponding to the limits of human peripheral vision, or a lesser or broader region, a region corresponding to the display capabilities of the client device, or a broader region thereof, and so on. In one example, the FOV may be implicit. For instance, the client device may provide a screen size or other indication of the FOV to the processing system as part of or in connection with an initial request from the client device to experience the volumetric video, where it is assumed that the FOV size does not change.

At step 340, the processing system renders a plurality of two-dimensional subframes comprising two-dimensional projections of the at least one frame of the volumetric video, based upon the first viewport of the client device. In one example, at least one of the plurality of two-dimensional subframes is rendered to include visual information that exceeds the field-of-view using a panoramic representation (e.g., an equirectangular projection or cubemap). In one example, the plurality of two-dimensional subframes comprises a first two-dimensional subframe rendered from the first viewport and a second two-dimensional subframe rendered from a second viewport. For instance, the second viewport may be offset from the first viewport with respect to at least one of a position within a space of the volumetric video or an orientation within the space of the volumetric video. In one example, the first two-dimensional subframe and the second two-dimensional subframe are rendered as two-dimensional projections from a same frame of the at least one frame of the volumetric video.

In one example, the first viewport comprises a predicted viewport. For instance, the first viewport may not be the actual/current viewport, but one that is predicted, e.g., based upon the current viewport, one or more recent viewports prior to the current viewport, based upon the popular viewports among other users, popular viewports among other users with a time weighting, etc. The predicted viewport may be provided by the client device and obtained at step 330, or may be determined by the processing system as part of step 340. For instance, the predicted viewport may be determined in accordance with one or more MLMs that may be applied by the processing system.

To illustrate, step 340 may include generating a predicted viewport based upon at least the first viewport in accordance with a MLM. In one example, the MLM may generate the predicted viewport based upon a plurality of prior viewports, the plurality of prior viewports including the first viewport (the inputs to the MLM may include the recent viewports at the client device). The MLM may learn a trajectory and anticipate a change in position of the viewport, may anticipate a change in orientation, etc. In addition, in one example, the MLM may account for what aspects of the volumetric video are most popular among other users (e.g., the most popular viewports for a particular frame or sequence of frames among other users). In one example, the MLM may also take into account user preferences regarding what is of interest to a user of the client device (e.g., whether user is most interested in a particular player at a sporting event, most interested in a particular car in an auto race, etc.).

At optional step 350, the processing system may encode the plurality of two-dimensional subframes. For example, the encoding may comprise an interframe compression. The interframe compression may be among time-sequential subframes of the plurality of two-dimensional subframes or may be among at least one of: spatial-adjacent subframes of the plurality of two-dimensional subframes or spatial-overlapping subframes of the plurality of two-dimensional subframes. For example, the encoding may comprise H.264/H.265 encoding, or compression, multi-view video coding (MVC), and so forth. In one example, the encoding may further include intraframe compression applied to the plurality of two-dimensional subframes.

At step 360, the processing system transmits the plurality of two-dimensional subframes to the client device. In one example, the plurality of two-dimensional subframes may be compressed/encoded in accordance with optional step 350. In such an example, the client device may decode one or more of the plurality of two-dimensional subframes, e.g., based upon an actual viewport determined at the client device, and may display the decoded two-dimensional subframe(s) via a display for the user. The decoding may be via H.264/H.265 decoders of the client device, for example. Following step 360, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-360 for additional frames of the volumetric video, for frames of a different volumetric video, for a different client device, and so on. In another example, the method 300 may include requesting and receiving the volumetric video, e.g., from a content server. In another example, the method 300 may include determining whether the at least one frame is already possessed by the processing system, e.g., before requesting the at least one frame from a content server or the like. In another example, the method 300 may include obtaining user preferences, obtaining information regarding popular viewports of the volumetric video, and so on. In still another example, the method 300 may include obtaining training data to apply to a MLA to produce a MLM for predicting a viewport. Thus, these and other modifications are all contemplated within the scope of the present disclosure.

FIG. 4 illustrates a flowchart of a method 400 for selecting and presenting a two-dimensional subframe of a frame of a volumetric video, in accordance with the present disclosure. In one example, the method 400 is performed by a component of the system 100 of FIG. 1, such as by one of device 132, device 133, and so forth, and/or any one or more components thereof (e.g., a processor, or processors, performing operations stored in and loaded from a memory), and so on. In one example, the steps, functions, or operations of method 400 may be performed by a computing device or system 500, and/or processor 502 as described in connection with FIG. 5 below. For instance, the computing device or system 500 may represent any one or more components of one or more components of the system 100 of FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and proceeds to optional step 410 or to step 420.

At optional step 410, the processing system may request a volumetric video from a network-based proxy (e.g., an "edge proxy" such as an edge server deployed in an edge cloud of a telecommunication network, from a CDN edge server, and so forth).

At step 420, the processing system provides a viewport to the network-based proxy. For example, the processing system may calculate a position and an orientation within a space of the volumetric video. In one example, the processing system may also determine a field-of-view (FOV). The position, orientation, and/or the FOV may be determined in accordance with the capabilities of the processing system (e.g., the size and resolution of the display), in accordance with a physical position and orientation of the processing system (e.g., determined via a gyroscope and compass, a global positioning system (GPS), or the like, via eye and/or gaze tracking, based upon distance estimates to one or more AR markers via a device camera, and so forth, and/or in accordance with one or more user inputs (e.g., a keyboard input, a gesture, a voice command, or the like instructing the processing system to move a viewport orientation up, down, left, right, etc., to move the viewport position forward, backward, left, right, up, down, etc., to zoom in or out, and so forth). In one example, step 420 may include calculating a predicted viewport. In other words, the viewport provided at step 420 may comprise the predicted viewport. For instance, the processing system (e.g., of a client device) may implement one or more MLMs for predicting a viewport as similarly described above in connection with step 340 of the example method 300.

At step 430, the processing system obtains a plurality of two-dimensional subframes from the network-based proxy in accordance with the viewport. For instance, the plurality of two-dimensional subframes may be selected and/or generated by the network-based proxy based upon the viewport provided at step 420. For example, the plurality of two-dimensional subframes may comprise two-dimensional projections of at least one frame of the volumetric video, where the projections are based upon the viewport of the client device. The two-dimensional subframes may be of the same or a similar nature as described above in connection with step 340 of the example method 300. For instance, the plurality of two-dimensional subframes may comprise a first two-dimensional subframe rendered from a first viewport and a second two-dimensional subframe rendered from a second viewport. For instance, the first viewport may be the viewport provided at step 420 (or may comprise a viewport that is predicted by the network-based proxy in accordance with the viewport provided at step 420), and the second viewport may be offset from the first viewport with respect to at least one of: a position within a space of the volumetric video or an orientation within the space of the volumetric video. In one example, the first two-dimensional subframe and the second two-dimensional subframe are rendered as two-dimensional projections from a same frame of the at least one frame of the volumetric video.

At step 440, the processing system selects at least one of the plurality of two-dimensional subframes to display. For instance, the processing system may determine an actual, current, and/or more recently determinable viewport (e.g., a most current position, orientation, and/or FOV) and may select a two-dimensional subframe that corresponds to or best matches the viewport.

At optional step 450, the processing system may decode one or more of the at least one of the plurality of two-dimensional subframes, e.g., based upon an actual viewport determined at the client device at step 440. For example, as described above, the plurality of two-dimensional subframes may be encoded/compressed via one or more techniques, such that decoding may precede the displaying to follow at step 460. In one example, the decoding may be via H.264/H.265 decoders which may be part of the processing system, or which are made available to and which are utilized by the processing system.

At step 460, the processing system displays the two-dimensional subframe(s) that is/are selected (and in one example that is/are decoded at optional step 450). For example, step 460 may comprise presenting the two-dimensional subframe(s) via display hardware of the processing system and/or sending raw data of the two-dimensional subframe(s) to display hardware in communication with the processing system for presentation thereon. Following step 460, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400, such as steps 420-460 for additional frames of the volumetric video, for a different volumetric video, and so on. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 or FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1, or described in connection with the method 300 of FIG. 3 or the method 400 of FIG. 4 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for providing two-dimensional subframes of a frame of a volumetric video or for selecting and presenting a two-dimensional subframe of a frame of a volumetric video, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for providing two-dimensional subframes of a frame of a volumetric video or for selecting and presenting a two-dimensional subframe of a frame of a volumetric video (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing two-dimensional subframes of a frame of a volumetric video or for selecting and presenting a two-dimensional subframe of a frame of a volumetric video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, at least one frame of a volumetric video comprising a point cloud-based volumetric video or a three-dimensional mesh-based volumetric video;
   obtaining, by the processing system, a first viewport of a client device, the first viewport associated with the at least one frame of the volumetric video;
   rendering, by the processing system in response to the obtaining the first viewport of the client device, a plurality of two-dimensional subframes comprising two-dimensional projections of the at least one frame of the volumetric video, based upon the first viewport of the client device, wherein the plurality of two-dimensional subframes comprises a first two-dimensional subframe rendered from the first viewport and a second two-dimensional subframe rendered from a second viewport, wherein the first two-dimensional subframe and the second two-dimensional subframe are rendered as the two-dimensional projections from a same frame of the at least one frame of the volumetric video; and
   transmitting, by the processing system, the plurality of two-dimensional subframes to the client device.

2. The method of claim 1, wherein the volumetric video is encoded as a compressed volumetric video, wherein the method further comprises:
   decoding the compressed volumetric video.

3. The method of claim 1, wherein the first viewport comprises a position and an orientation.

4. The method of claim 3, wherein the orientation comprises a yaw, a pitch, and a roll.

5. The method of claim 3, wherein the first viewport further comprises a field-of-view.

6. The method of claim 5, wherein at least one of the plurality of two-dimensional subframes is rendered to include visual information that exceeds the field-of-view using a panoramic representation.

7. The method of claim 1, wherein the second viewport is offset from the first viewport with respect to at least one of:
   a position within a space of the volumetric video; or
   an orientation within the space of the volumetric video.

8. The method of claim 7, wherein the first viewport comprises a predicted viewport.

9. The method of claim 1, further comprising:
   encoding the plurality of two-dimensional subframes, wherein the transmitting comprises transmitting to the client device the plurality of two-dimensional subframes that is encoded.

10. The method of claim 9, wherein the encoding comprises an interframe compression.

11. The method of claim 10, wherein the interframe compression is among time-sequential subframes of the plurality of two-dimensional subframes.

12. The method of claim 11, wherein the interframe compression is among at least one of:
   spatial-adjacent subframes of the plurality of two-dimensional subframes; or
   spatial-overlapping subframes of the plurality of two-dimensional subframes.

13. The method of claim 1, wherein the first viewport of the client device is obtained from the client device.

14. The method of claim 1, wherein the rendering the plurality of two-dimensional subframes based upon the first viewport of the client device comprises:
   generating a predicted viewport based upon at least the first viewport in accordance with a machine learning model.

15. The method of claim 14, wherein the machine learning model generates the predicted viewport based upon a plurality of prior viewports, the plurality of prior viewports including the first viewport.

16. The method of claim 1, wherein the at least one frame of the volumetric video comprises a point cloud.

17. The method of claim 1, wherein the at least one frame of the volumetric video comprises a three-dimensional mesh.

18. A device comprising:
a processor; and
a computer-readable medium storing instructions which, when executed by the processor, cause the processor to perform operations, the operations comprising:
obtaining at least one frame of a volumetric video comprising a point cloud-based volumetric video or a three-dimensional mesh-based volumetric video;
obtaining a first viewport of a client device, the first viewport associated with the at least one frame of the volumetric video;
rendering, in response to the obtaining the first viewport of the client device, a plurality of two-dimensional subframes comprising two-dimensional projections of the at least one frame of the volumetric video, based upon the first viewport of the client device, wherein the plurality of two-dimensional subframes comprises a first two-dimensional subframe rendered from the first viewport and a second two-dimensional subframe rendered from a second viewport, wherein the first two-dimensional subframe and the second two-dimensional subframe are rendered as the two-dimensional projections from a same frame of the at least one frame of the volumetric video; and
transmitting the plurality of two-dimensional subframes to the client device.

19. A non-transitory computer-readable medium storing instructions which, when executed by a processing system including at least one processor, cause the processing system to perform operations, the operations comprising:
obtaining at least one frame of a volumetric video comprising a point cloud-based volumetric video or a three-dimensional mesh-based volumetric video;
obtaining a first viewport of a client device, the first viewport associated with the at least one frame of the volumetric video;
rendering, in response to the obtaining the first viewport of the client device, a plurality of two-dimensional subframes comprising two-dimensional projections of the at least one frame of the volumetric video, based upon the first viewport of the client device, wherein the plurality of two-dimensional subframes comprises a first two-dimensional subframe rendered from the first viewport and a second two-dimensional subframe rendered from a second viewport, wherein the first two-dimensional subframe and the second two-dimensional subframe are rendered as the two-dimensional projections from a same frame of the at least one frame of the volumetric video; and
transmitting the plurality of two-dimensional subframes to the client device.

20. The non-transitory computer-readable medium of claim 19, wherein the volumetric video is encoded as a compressed volumetric video, wherein the operations further comprise:
decoding the compressed volumetric video.

* * * * *